United States Patent [19]
Kazami et al.

[11] Patent Number: 5,398,087
[45] Date of Patent: Mar. 14, 1995

[54] CAMERA READING INFORMATION APPLIED TO A FILM UNIT

[75] Inventors: Kazuyuki Kazami; Naoki Tomino, both of Tokyo, Japan

[73] Assignee: Nikon Corporation, Tokyo, Japan

[21] Appl. No.: 272,309

[22] Filed: Jul. 8, 1994

Related U.S. Application Data

[63] Continuation of Ser. No. 147,432, Nov. 5, 1993, abandoned, which is a continuation of Ser. No. 50,734, Apr. 21, 1993, abandoned, which is a continuation of Ser. No. 924,597, Jul. 24, 1992, abandoned, which is a continuation of Ser. No. 807,733, Dec. 16, 1991, abandoned, which is a continuation of Ser. No. 652,137, Feb. 7, 1991, abandoned.

[30] Foreign Application Priority Data

Feb. 9, 1990 [JP] Japan ................................ 2-30507

[51] Int. Cl.⁶ .............................................. G03B 7/00
[52] U.S. Cl. ................................... 354/21; 354/173.1; 354/207
[58] Field of Search .................... 354/21, 105, 106, 75, 354/76, 173.1, 173.11, 207

[56] References Cited

U.S. PATENT DOCUMENTS

| | | |
|---|---|---|
| 4,678,300 | 7/1987 | Beach ..................................... 354/21 |
| 4,860,037 | 8/1989 | Harvey ................................... 354/21 |
| 4,864,332 | 9/1989 | Harvey ................................... 354/21 |
| 4,878,075 | 10/1989 | Cannon ................................ 354/173.1 |
| 4,980,709 | 12/1990 | Cocca .................................. 354/173.1 |
| 4,994,833 | 2/1991 | Cocca .................................... 354/207 |

FOREIGN PATENT DOCUMENTS

1-233431 9/1989 Japan .

*Primary Examiner*—David M. Gray
*Attorney, Agent, or Firm*—Shapiro and Shapiro

[57] ABSTRACT

The camera of the present invention includes means for recording and reproducing information regarding the photographed frames of film, means for applying onto the cartridge of a film unit discriminative information indicative of whether the reading-out of the information regarding photographed frames is necessary, means for detecting the discriminative information, and means for controlling whether the reading out of the information regarding photographed frames should be effected in conformity with the result of the detection. Thus, when the camera is loaded with a film unit which does not require the reading-out of the information regarding photographed frames, like a new film unit which has never been loaded into a camera, the operation of reading out the information regarding photographed frames is saved.

17 Claims, 8 Drawing Sheets

CAMERA READING INFORMATION APPLIED TO A FILM UNIT

This is a continuation of application Ser. No. 08/147,432, filed Nov. 5, 1993, which is a continuation of application Ser. No. 08/050,734, filed Apr. 21, 1993, which is a continuation of application Ser. No. 07/924,597, filed Jul. 24, 1992, which is a continuation of application Ser. No. 07/807,733, filed Dec. 16, 1991, which is a continuation of application Ser. No. 07/652,137, filed Feb. 7, 1991, all now abandoned.

BACKGROUND OF THE INVENTION

1. Field of the Invention

This invention relates to a camera fit for a film unit having film, a cartridge containing the film therein and means on which particular information in recorded.

2. Related Background Art

Cameras of this type include those disclosed in U.S. Pat. Nos. 4,860,037 and 4,864,332. The cameras disclosed in these patents are both fit for a film unit in which a magnetic recording part is provided on the leader portion of film. In such cameras, when this film unit is loaded into the camera and photographing is performed and the midroll interrupt operation for taking the film unit out of the camera before all the frames of the film are photographed is applied, the rewinding of the film is started. During the rewinding, information regarding the number of photographed frames is recorded on the magnetic recording part through a magnetic head disposed in the film feeding path of the camera. When the film unit having such information recorded on the magnetic recording part is again loaded into the camera, the winding of the film is started. During the winding, the information of the number of photographed frames recorded on the magnetic recording part through the magnetic head is read out. This winding is controlled in conformity with the read-out information of the number of photographed frames, and is stopped when the unphotographed frame to be photographed next time is brought to a photographing position opposed to a photo-taking lens. Thereafter, photographing can be continued from that unphotographed frame. When the information that all frames have been photographed is read out from the information recording part, the film is rewound into the cartridge for the purpose of double exposure prevention, and the photographing operation is prohibited from being performed and a warning to that effect is given. The cameras described above are cameras of the so-called ordinary wind mode in which photographing starts from the frame which is most adjacent to the leader portion of the film.

U.S. Pat. No. 4,878,075 also discloses a camera which performs a similar function. However, the film unit fit for this camera has a magnetic recording part provided near each frame on film. In this camera, each time a frame is photographed, the information that the frame has been photographed is recorded on the magnetic recording part by a magnetic head. This camera is a camera of the so-called prewind-mode in which after all frames have once been wound, photographing is performed from the frame which is on the most distal end side (the magazine shaft side in the cartridge) and each time photographing is completed, rewinding is effected by one frame. Therefore, the film unit is once taken out of the camera and then is again loaded into the camera, the information on the magnetic recording part is read out by the magnetic head while the winding is performed, and the winding is stopped when the information to the effect that the frame is photographed frame is read out. And when rewinding of film is started and an unphotographed frame which is next to the photographed frame is advanced to a photographing position, the rewinding is stopped. Thereafter, photographing can be continued from the unphotographed frame. When all frames have been photographed, the film is rewound into the cartridge without the information of unphotographed frames being read out. The camera detects by a switch provided in a film feeding path that all the frames of the film have been photographed and therefore all the film has been rewound into the cartridge, that is, the film is absent in the film feeding path, and in this case, the camera gives a warning to that effect.

In any of the above-described cameras, the operation for reading out the information regarding photographed frames from the magnetic information recording part on the film is also performed when a new film unit that has never been loaded into the camera is loaded into the camera. Such information is not recorded on such new film and therefore, the reading-out operation in this case leads to the waste of electric power.

SUMMARY OF THE INVENTION

The object of the present invention is to eliminate the above-noted disadvantage peculiar to the prior art. To this end, the camera of the present invention includes means for applying onto the cartridge of a film unit discriminative information indicative of whether the reading-out of information regarding the photographed frames of film is necessary, means for detecting said discriminative information, and means for controlling whether the reading-out of the information regarding the photographed frames should be done in conformity with the result of said detection. Thus, according to the camera of the present invention, when a film unit which does not require the reading-out of the information regarding the photographed frames, like a new film unit that has never been loaded into a camera, is loaded into the camera, the operation of reading out the information regarding the photographed frames is saved and the waste of the electric power as in the prior art can be prevented.

In a preferred embodiment of the present invention, the information regarding the photographed frames is magnetically recorded on an information recording part on the film. Also, the discriminative information indicative of whether the reading-out of this information is necessary is applied in an externally discriminable form onto the cartridge. Accordingly, said discriminative information can be visually recognized by the user of the camera.

DESCRIPTION OF THE PREFERRED EMBODIMENT

Figure 1:
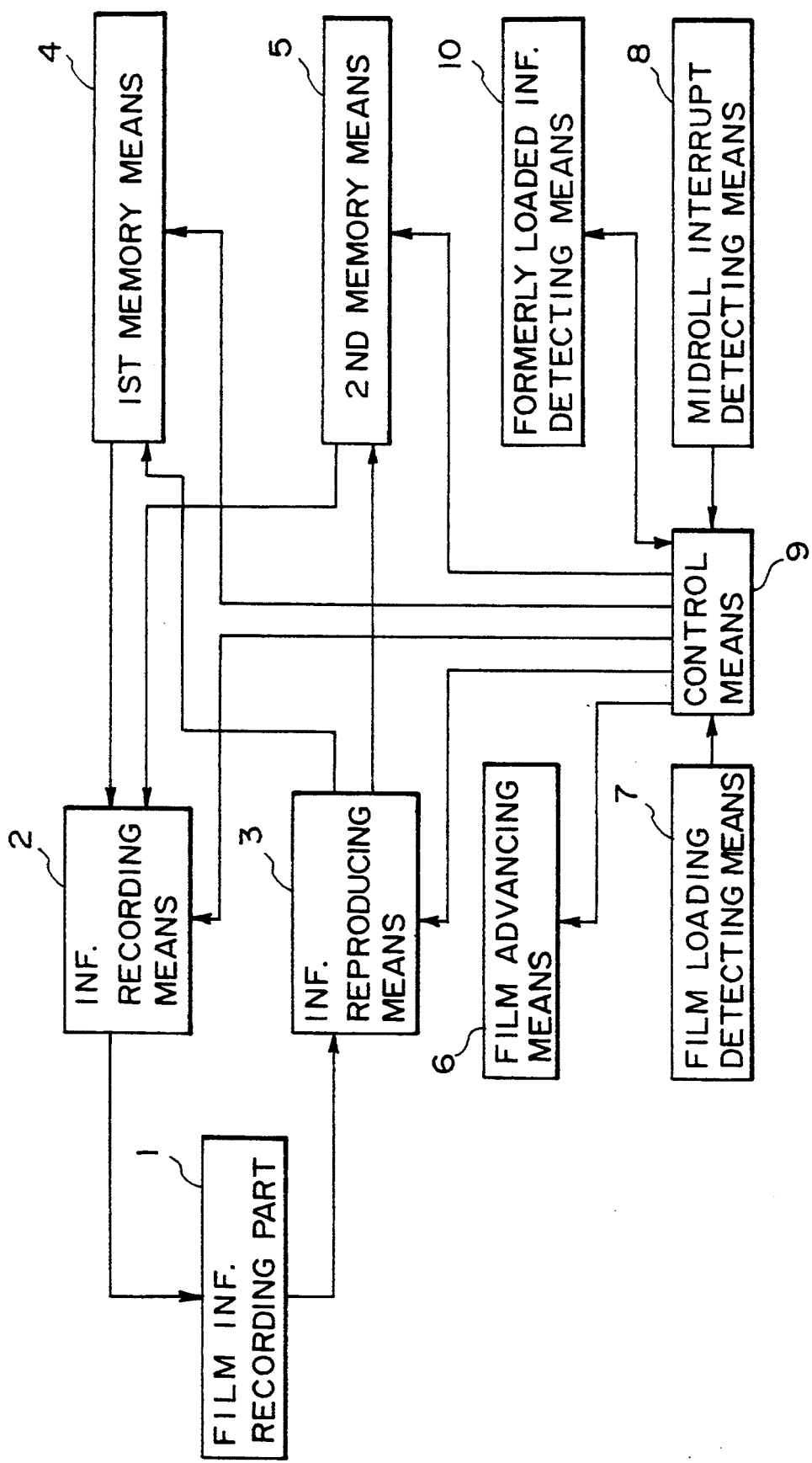
FIG. 1 is a block diagram showing the correlations between means performing the various functions of a camera according to an embodiment of the present invention.

FIG. 1 is a block diagram showing the correlations between means performing various functions in the film feeding control device of a camera according to the present invention.

In FIG. 1, an information recording part 1 is provided on the leader portion of film, not shown. Information regarding the number of photographed frames is written on this part 1 by information recording means 2, and the written information is read out by information reproducing means 3.

First memory means 4 stores therein information L corresponding to a first film feeding direction (the winding direction), of the information of the number of photographed frames recorded on the information recording part 1. This information L is indicative of what is the last frame number when photographing is effected from the leader portion side of the film toward the distal end side (the reel, i.e., magazine shaft side). Second memory means 5 stores therein information T corresponding to a second film feeding direction (the rewinding direction), of the information of the number of photographed frames recorded on the information recording part 1. This information T is indicative of what is the last frame number when photographing is effected from the distal end side of the film toward the leader portion. The first memory means and the second memory means send to the information recording means 2 the information L and T of the above-described two types of numbers of photographed frames stored therein, and the information recording means 2 writes such information onto the information recording part 1. The first memory means and the second memory means receive said two types of information L and T, respectively, reproduced by the information reproducing means 3 and store the reproduced information therein.

Film advancing means 6 electrically performs the winding and rewinding of the film.

Film loading detecting means 7 detects that a film cartridge has been received into a chamber in the camera.

Midroll interrupt detecting means 8 detects that a manual operation for starting the rewinding operation has been exerted to take the cartridge out of the camera before all the film in the film cartridge is photographed, that is, with unused frames being left.

Formerly loaded information detecting means detects whether formerly loaded information is applied onto the loaded film cartridge. This formerly loaded information is applied in an externally discriminable form onto a film cartridge when the cartridge is loaded into the chamber of the camera according to the present embodiment or a camera similar thereto, and indicates that the cartridge has been formerly loaded, that is, the cartridge has once been loaded into a camera. As specific examples of the form of formerly loaded information and detection means therefor, mention may be made of forming a recess or a flaw on a cartridge and photoelectrically detecting the presence thereof, as disclosed, for example, in U.S. Pat. No. 4,678,300 and copending U.S. application Ser. No. 465,310, which was abandoned in favor of continuation application Ser. No. 747,458 filed Aug. 12, 1991.

Control means 9 receives information from the film loading detecting means 7, the midroll interrupt detecting means 8, the formerly loaded information detecting means 10 and other functional means, not shown, and controls the operations of the information recording means 2, the information reproducing means 3, the first memory means 4, the second memory means 5, the film advancing means 6 and functional means, not shown, on the basis of the information.

Although described later in detail, the epitome of the operation of the present embodiment is as follows.

When the formerly loaded information detecting means 10 detects that a film cartridge loaded into the camera has the formerly loaded information thereon, there is the possibility of a partly used state in which part of the film in the cartridge has been used and the rest of the film remain unused or a totally used state in which all of the film has been used and therefore, the operation for reading out the information L and T of the numbers of photographed frames on the information recording part 1 of the film is performed by the information reproducing means 3. If the information thus read out indicates that the film is film in the partly used state, the film winding operation for opposing the frame to be photographed next time to the rear of a photo-taking lens is performed in accordance with that information, and if the information read out indicates that the film is film in the totally used state, the film winding operation is prohibited to thereby prevent double exposure.

On the other hand, When the formerly loaded information detecting means 10 detects that the film cartridge loaded into the camera has no formerly loaded information thereon, the film in the cartridge is all unused and there is not the possibility that the information L and T of the numbers of photographed frames is written on the information recording part 1 of the film and therefore, the reading-out operation by the information reproducing means 3 is inhibited.

Figure 2:
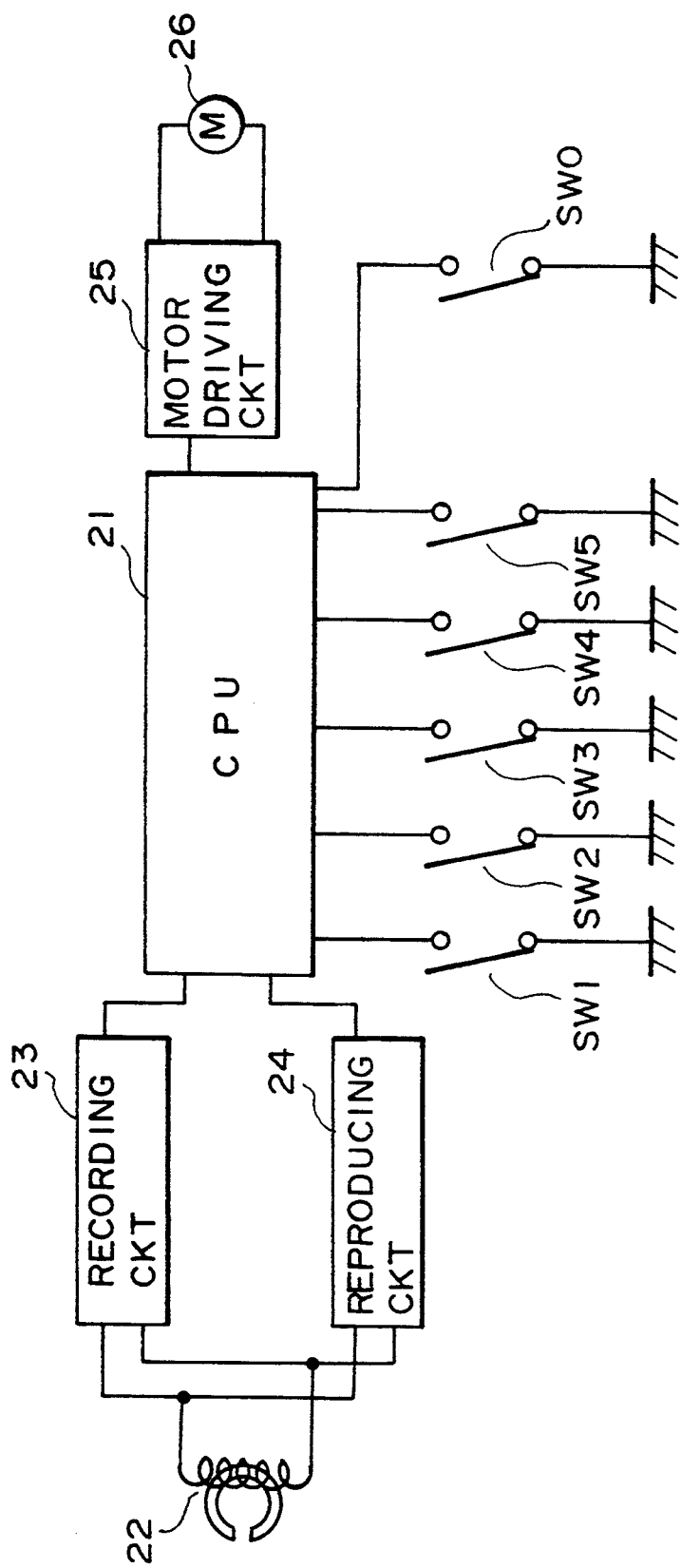
FIG. 2 is a circuit block diagram of the same embodiment.

FIG. 2 is a circuit block diagram corresponding to FIG. 1. In FIG. 2, CPU 21 controls the operations of a recording circuit 23 and a reproducing circuit 24. A magnetic head 22 capable of recording and reproducing is connected to the circuits 23 and 24. The recording circuit 23 writes the information L and T of the numbers of photographed frames sent from the CPU 21 on the magnetic recording part 1 of the film through the magnetic head 22. On the other hand, the reproducing circuit 24 send to the CPU 21 the information L and T of the numbers of photographed frames read through the magnetic head 22, and the CPU 21 stores the information L and T in memories contained in the CPU 21. The CPU 21 also controls the operation of a motor driving circuit 25 for driving a film feeding motor 26, as will be described later. Also, the CPU 21 has connected thereto a switch SW1 adapted to be closed and opened in response to the opening and closing of the back lid of the camera, a switch SW2 adapted to be closed in response to the operation of starting the rewinding of the film for the midroll interrupt of the film, a switch SW3 for counting perforations which pass the front of itself with the feeding of the film, a switch SW4 for detecting the formerly loaded information provided on the film cartridge, a switch SW5 adapted to be closed upon detecting that film has been loaded into a chamber in the camemra, and a switch SW0 for changing over the film feeding mode to the normal wind mode (the type in which the film is wound by one frame during each photographing and is rewound after the photographing of all frames) and the prewind mode (the type in which the film of all frames is prewound and is rewound by one frame during each photographing). Although all these switches are expressed by the symbols of switches having contacts, it is to be understood that the switch SW3 for detecting the number of perforations passing the front of itself and the switch SW4 for detecting the visually confirmable formerly loaded information on the cartridge are provided by conventional photoelectric switches.

Figure 7:
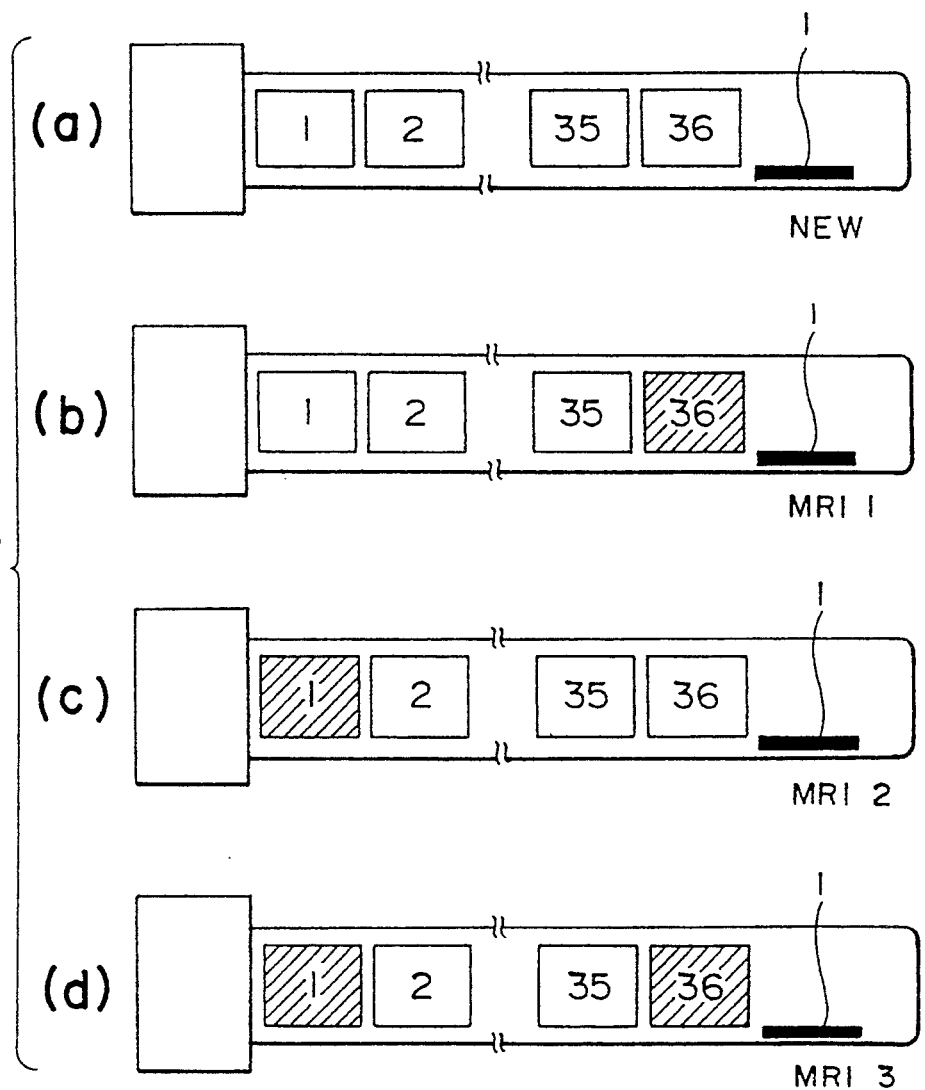
FIG. 7 shows various states of use of film loaded in the camera according to the same embodiment.

FIGS. 7(*a*)–7(*d*) show four kinds of states of use of the film loaded in the camera of the present embodiment and used.

In these figures, the frames of the film, like the film shown in U.S. Pat. No. 4,878,075, are given frame numbers 1, 2, 3, ..., 35, 36 in order from the distal end side of the film, i.e., the side on which the film is attached to a reel (a magazine shaft), and one perforation, not shown, is formed in the outer side of one longer edge of each frame. The information recording part 1 provided on the leader portion of the film, i.e., the right-hand lower portion of the 36th frame, is constructed of a magnetic recording medium provided as a coating on the surface of the film, and is capable of writing thereon the information L and T regarding the photographed frames. Besides such information, the information inherent to this film, i.e., the information of the total number of frames (in the case of the film of FIG. 7, 36) and the film speed can be pre-recorded on the information recording part 1 before the film is shipped from the factory.

FIG. 7(*a*) shows new film in which all frames (all of 36 frames in the case shown) are unphotographed. Although described later in detail, if this film has the history of having once been loaded in the camera of the present embodiment and taken out of the camera without being photographed, the following data indicative of the fact that this film is new film is written as the information L and T of the numbers of photographed frames on the information recording part 1. That is, a value 37 which is the greatest number (the number equal to the total number of frames, i.e., 36 in the case shown) in this film plus 1 is written as the information L, and 0 (zero) is written as the information T. If the film has no formerly loaded history, the information L and T of the numbers of photographed frames is not written on the information recording part 1.

FIG. 7(*b*) shows a partly used state, i.e., a state in which the new film has been fed in the normal wind mode, and then only one frame, i.e., in the case of this figure, only the 36th frame most adjacent to the leader portion, has been photographed and midroll interrupt has been effected. Although described later in detail, in this case, the information of the numbers of photographed frames recorded on the information recording part 1 is: L=36 because the 36th frame given the greatest number (the number equal to the total number of frames) in this film is a photographed frame, and T=0 because the first frame is an unphotographed frame. If the 36th frame and the 35th frame are photographed frames, the information L will be 35. The film thus photographed in the normal wind mode and then subjected to the midroll interrupt is given a classification name MR11 for the sake of convenience.

FIG. 7(*c*) shows a partly used state, i.e., a state in which the new film has been fed in the prewind mode and then only one frame, i.e., only the first frame has been photographed and midroll interrupt has been effected. In this case, the information of the numbers of photographed frames is: L=37 because the 36th frame given the greatest number in this film is an unphotographed frame and therefore 1 is added to this greatest number, and T=1 because the first frame is a photographed frame. If the first and second frames are photographed frames, the information T will be 2. The film thus photographed in the prewind mode and then subjected to the midroll interrupt is given a classification name MR12 for the sake of convenience.

FIG. 7(*d*) shows film in a partly used state in which the film has been subjected to both of the states shown in FIGS. 7(*b*) and 7(*c*). In this case, the information of the numbers of photographed frames is: L=36 and T=1. The film thus subjected to both of the midroll interrupt after photographing has been effected in the normal wind mode and the midroll interrupt after photographing has been effected in the prewind mode is given a classification name MR13.

The operation of the present embodiment will now be described with respect to each routine.

Figure 5A:
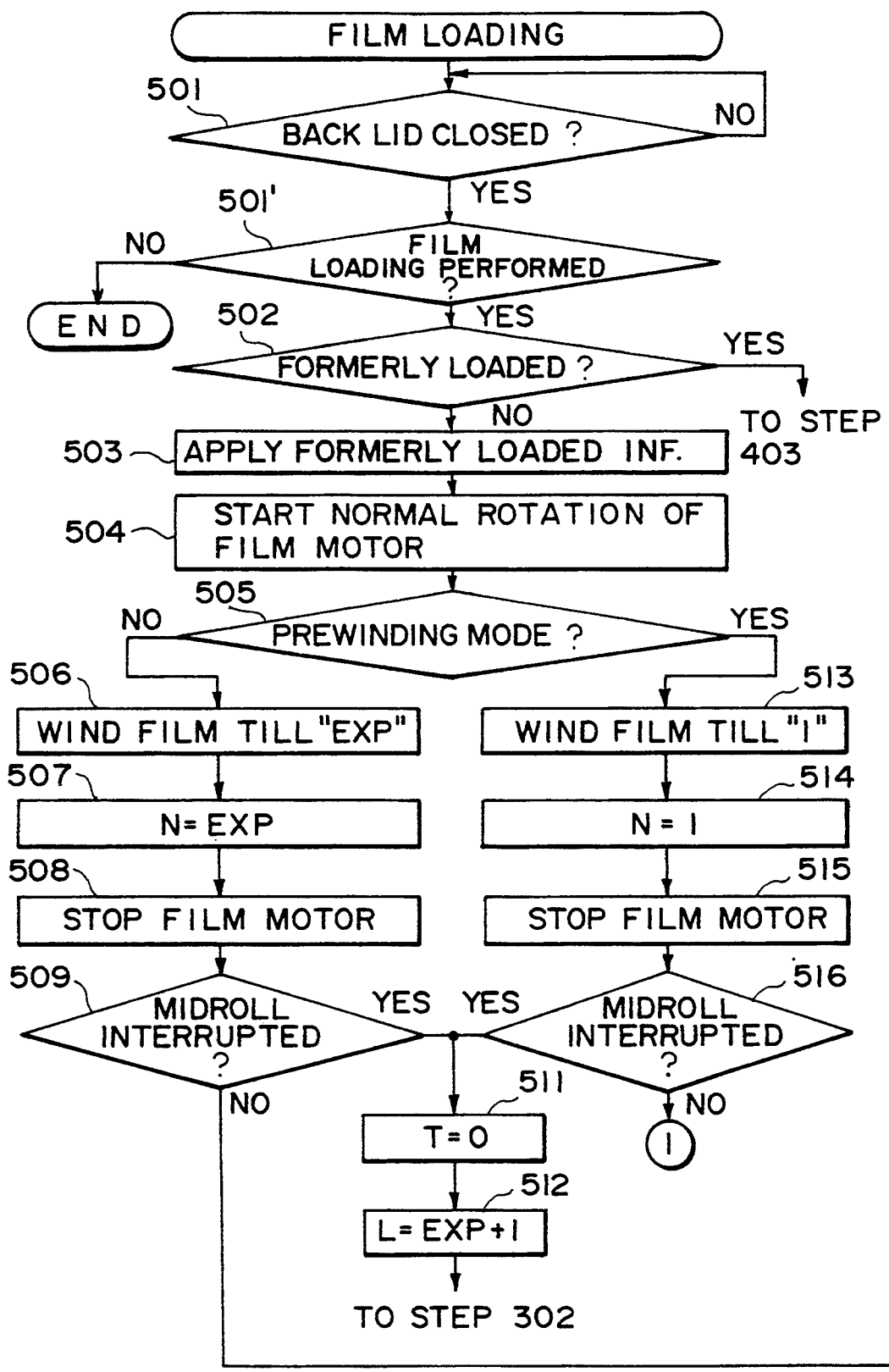
Figure 5B:
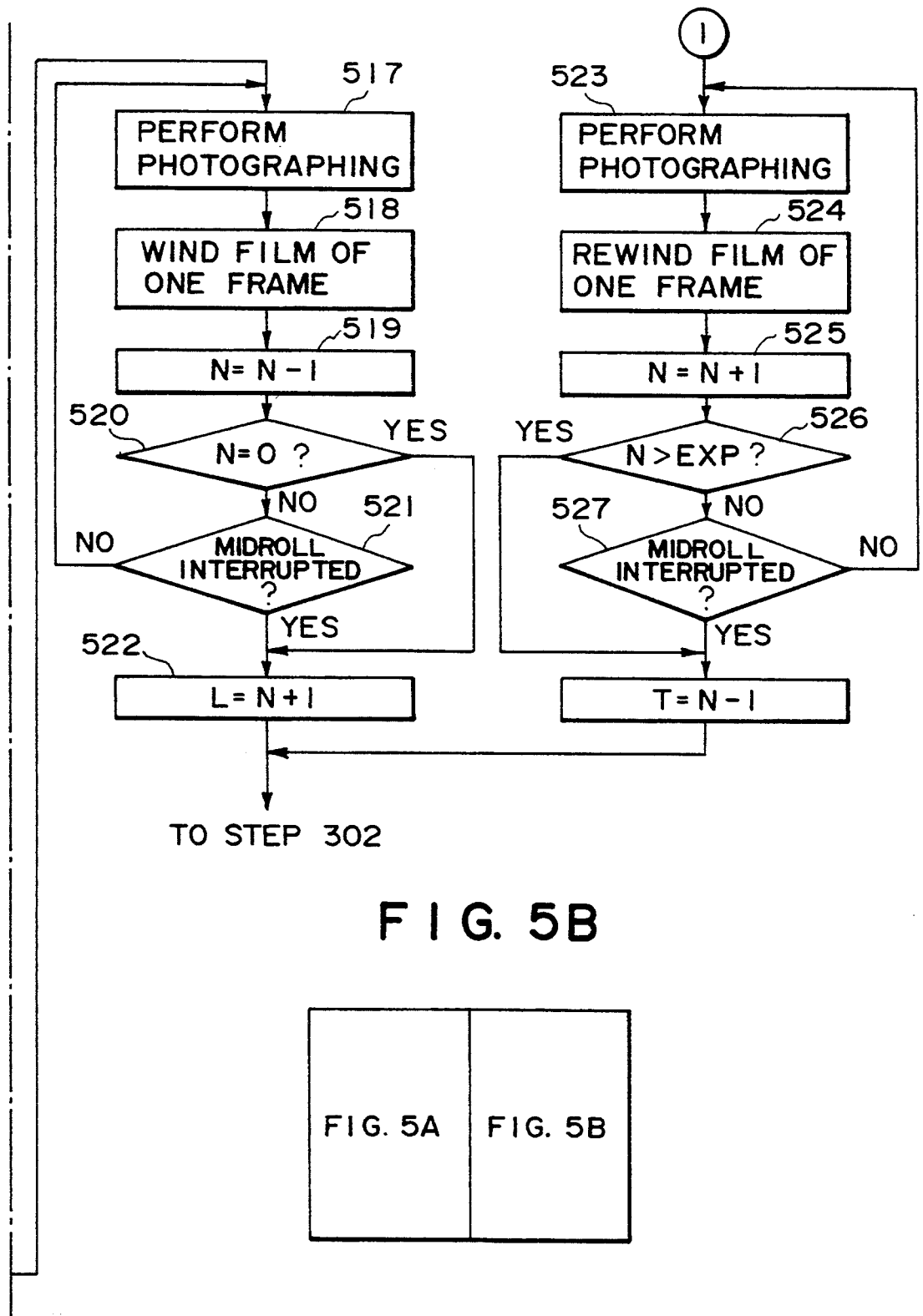
Figure 5:
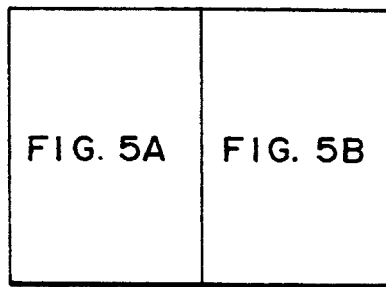

FIG. 5 is a flow chart chiefly showing, of the operations of the CPU 21, the operation when the film loaded in the camera is judged as new film having no formerly loaded history from the formerly loaded information on the film cartridge loaded in the camera.

Process Succeeding to Step 501: Film Loading Routine

At a step 501, whether the back lid of the camera has been closed is judged by whether the switch SW1 is ON, and if an affirmative answer "Y" is obtained, advance is made to a step 501', and if a negative answer "N" is obtained, the step 501 is repeated.

At the step 501', whether a film cartridge is loaded in the chamber in the camera is judged from the output of the detecting switch SW5. If the answer is "Y", advance is made to the next step 502, and if the answer is "N", the operation is terminated because it is useless to continue the operation.

At the step 502, whether the loaded film cartridge has once been loaded in the camera in the past, i.e., the presence or absence of the formerly loaded history, is detected by detecting whether the switch SW4 is ON. If the answer is "Y", there is the high possibility that the film has the formerly loaded history and the information L and T of the numbers of photographed frames is recorded on the information recording part 1 of the film and therefore, shift is made to the film discriminating process of FIG. 4 which will be described later, and the information L and T is read through the reproducing circuit 24 to thereby discriminate the state of use of the film. If the answer of the step 502 is "N", the film has no formerly loaded history and therefore, the reading of the information L and T of the numbers of photographed frames is saved, and advance is made to a step 503.

Process Succeeding to Step 503: the Case Where New Film Having No Formerly Loaded History Is Loaded At the step 503, the operation of applying the formerly loaded information is performed by means, not shown. As this means, mention may be made, for example, a solenoid for thrusting the surface of the cartridge by an electromagnetic drive force and forming a recess therein. However, a projection may be provided on the back of the back lid shown in U.S. Pat. No. 4,678,300 and a recess may be formed on the cartridge by a manual force applied when the back lid is closed by means of the projection. In this case, the step 503 can be omitted.

At the next step 504, the film feeding motor 26 is started in the direction of normal rotation to thereby start the winding of the film.

Subsequently, at a step 505, the switch SW0 is monitored to judge whether the prewind mode is now selected. If at the step 505, the answer is "N", that is, if the normal wind mode is selected, advance is made to a step 506, and if the answer is "Y", that is, if the prewind mode is selected, advance is made to a step 513'.

Process Succeeding to Step 506: the Case Where the Normal Wind Mode Is Selected for New Film Having No Formerly Loaded History At a step 506, film winding is continued in order that the frame of the number equal to the total number of frames EXP (in the case of the film of FIG. 7, 36) read in advance from the information recording part 1 of the film or the information recording part on the cartridge (so-called DX code), i.e., that frame of the loaded film which is given the greatest number and which is most adjacent to the leader portion (in the case of the film shown in FIG. 7, the 36th frame) may be positioned at an aperture rearward of the photo-taking lens.

At the next step 507, this numerical value data EXP (=36) is stored as numerical value data N to be indicated by a frame number counter, not shown, in a memory in the CPU 21.

When the winding up to the 36th frame is completed, the film feeding motor 26 is stopped at a step 508.

At the next step 509, whether there is an operation for commanding the midroll interrupt of the film is judged by whether the switch SW2 is ON. If the answer is "Y", advance is made to a step 511 (the operation succeeding to this step 511 will be described later). If the answer is "N", advance is made to a step 517.

Process Succeeding to Step 517: the Case Where the Normal Wind Mode Is Selected for New Film Having No Formerly Loaded History and Photographing Operation Is Performed At the step 517, the photographing operation (the photographing operation for the 36th frame positioned at the aperture rearward of the photo-taking lens) is performed on condition that an operation has been applied to a release button, not shown. The step 509 and the step 517 are repeated until the operation of commanding the midroll interrupt (the closing of the switch SW2) or the release operation is applied.

When the photographing operation is completed, at the next step 518, the film feeding of one frame for positioning an unphotographed frame at the aperture is effected, and here, the mode is the normal wind mode and therefore, the film winding by the normal rotation of the motor 26 is effected and the 35th frame becomes opposed to the aperture.

At the next step 519, 1 is decremented from the value N of the frame number counter.

Subsequently, at a step 520, whether the numerical value N of the frame number counter is 0 (zero) is judged. If the result of the judgment at the step 520 is "N", advance is made to a step 521. If the result is "Y", it means that photographing is effected from the film leader portion side by the normal wind mode and the photographing by the 1st frame is completed and no unphotographed frame is present. In this case, the program skips to a step 522.

At a step 521, whether there is an operation for commanding the midroll interrupt of the film is again judged by whether the switch SW2 is ON. If the result of the judgment is "Y", advance is made to a step 522. If the result is "N", return is made to the step 517 to enable the remaining unphotographed film to be photographed.

At the step 522, numerical value data resulting from 1 being incremented to the counter value N is set as the information L of the number of photographed frames in a first film feeding direction (the normal wind direction) (for example, if at the step 520, the answer is "Y", L=1 because N=0). Thereafter, the film rewinding process succeeding to the step 302 of the flow chart of FIG. 3 which will be described later is executed, and in this process, this value of L is written onto the information recording part 1 of the film.

Process Succeeding to Step 511: the Case Where the Normal Wind Mode Is Selected for New Film Having No Formerly Loaded History and the Film Is Taken out of the Camera without Being Never Photographed A step 511 is executed when the result of the judgment at the step 509 is "Y". The fact that the result of the judgment at the step 509 is "Y" means that new film has been loaded into the camera and the 36th frame has been positioned at the aperture, but there has been an operation for commanding the midroll interrupt without the film being never photographed and therefore, a numerical value 0 (zero) as the information T of the number of photographed frames in a second film feeding direction (the prewind direction) is stored into the memory in the CPU 21.

Subsequently, shift is made to a step 512, where a numerical value EXP+1 (in the case of the film of FIG. 7, 37) as the value of L is stored into the memory in the CPU 21 to indicate the absence of the number of photographed frames from the leader portion side.

Figure 3:
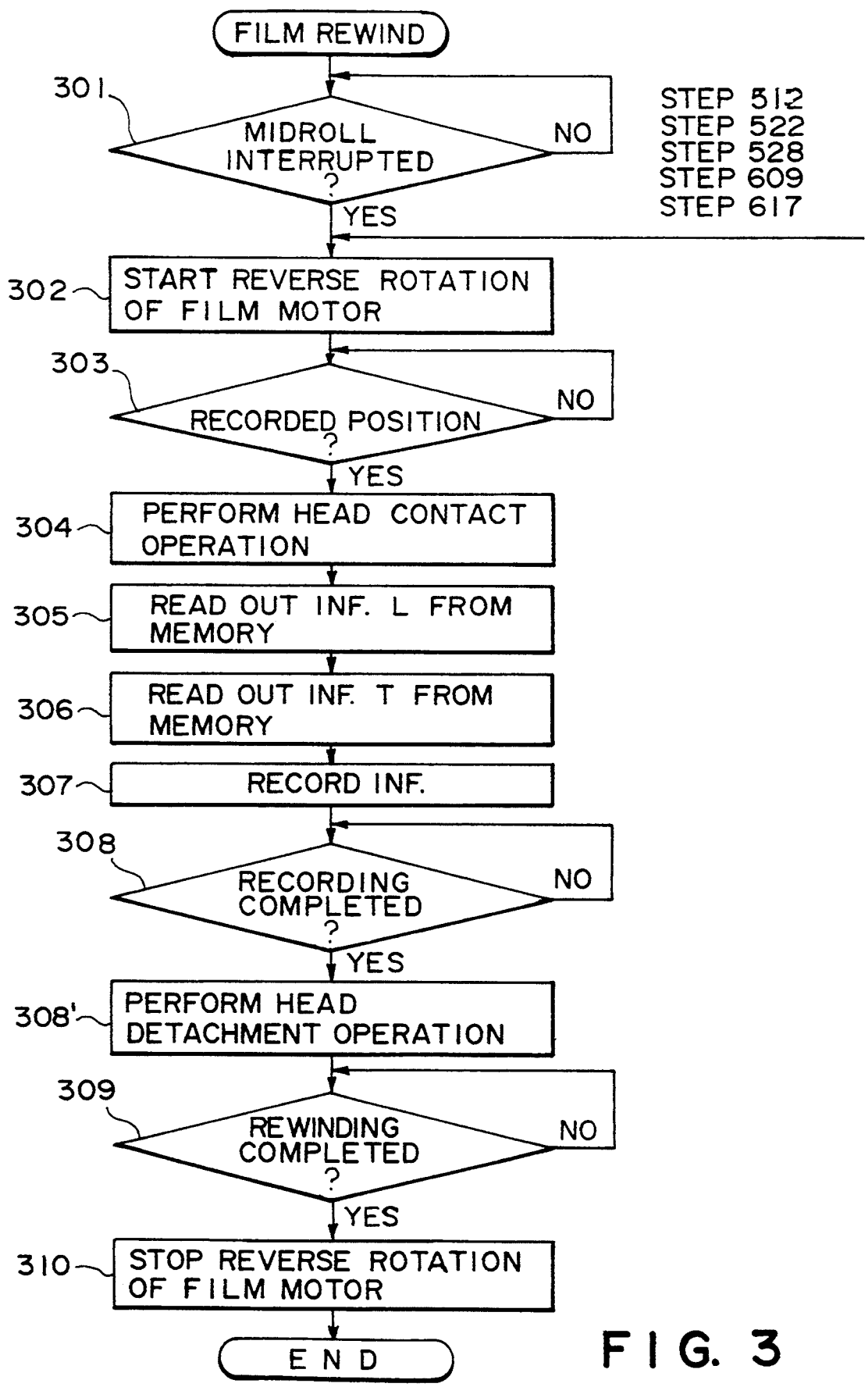
FIGS. 3 to 6 are flow charts showing the operations of the same embodiment.

Thereafter, shift is made to the process succeeding to the step 302 of FIG. 3, and in this process, the information L and T is recorded on the information recording part 1 of the film.

Process Succeeding to Step 513: the Case Where the Prewind Mode Is Selected for New Film Having No Formerly Loaded History If the prewind mode is selected at the step 505, advance is made to a step 513, where film winding is continued to position the first frame which is most adjacent to the distal end at the aperture rearward of the photo-taking lens.

At the next step 514, this numerical value data 1 is stored as numerical value data N to be indicated by the frame number counter, not shown, into the memory in the CPU 21.

When the winding up to the first frame, i.e., prewinding, is completed, the normal rotation of the film feeding motor 26 is stopped at the next step 515.

At the next step 516, whether there is an operation for commanding the midroll interrupt of the film is judged by whether the switch SW2 is ON. If the result of the judgment is "Y", advance is made to the aforedescribed step 511. If the result is "N", advance is made to a step 523.

Process Succeeding to Step 523: the Case Where the Prewind Mode Is Selected for New Film Having No Formerly Loaded History and Photographing Operation Is Effected At the step 523, the photographing operation (the photographing operation for the first frame positioned at the aperture rearward of the phototaking lens) is effected on condition that an operation has been applied to the release button, not shown. The step 516 and the step 523 are repeated until the operation of commanding the midroll interrupt (the closing of the switch SW2) or the release operation is applied.

When the photographing operation is completed, at the next step 524, the film feeding of one frame for positioning the unphotographed frame to be photographed next time at the aperture is effected, but since the mode is the prewind mode, the film rewinding of one frame by the reverse rotation of the motor 26 is effected and the second frame becomes opposed to the aperture.

At the next step 525, 1 is incremented to the value N of the frame number counter.

Subsequently, at a step 526, whether the value N of the frame number counter is greater than the total number of frames EXP (in the case of the film of FIG. 7, 36) is judged. If the result of the judgment is "Y", it means that photographing is effected from the distal end portion side of the film by the prewind mode and the photographing by the frame which is most adjacent to the leader portion (in the case of the film of FIG. 7, the 36th frame is completed and there is no unphotographed frame in the film. In this case, the program skips to a step 528 which will be described later. If the result of the judgment at the step 526 is "N", that is, if there is still an unphotographed frame or frames, advance is made to a step 527.

At the step 527, whether there is an operation for commanding the midroll interrupt of the film is again judged by whether the switch SW2 is ON. If the result of the judgment is "Y", advance is made to a step 528. If the result of the judgment is "N", return is made to the step 523, where a further photographing operation is made possible.

At the step 528, numerical value data resulting from 1 being decremented from the counter value N is set as the information of the number of photographed frames in the second film feeding direction (the prewind direction) (for example, where the film of FIG. 7 is used and the answer is "Y" at the step 526, T=36 because N=37). Thereafter, the film rewinding process succeeding to the step 302 of the flow chart of FIG. 3 is executed, and in this process, this value of T is written onto the information recording part 1 of the film.

Process Succeeding to Step 511: the Case Where the Prewind Mode Is Selected for New Film Having No Formerly Loaded History and the Film Is Taken Out of the Camera without Being Never Photographed If the result of the judgment at the step is "Y", the operation succeeding to the aforedescribed step 511 is executed.

FIG. 3 is a flow chart showing, of the operations of the CPU 21, the operation of rewinding the whole film into the cartridge.

Process Succeeding to Step 301: the Film Rewinding Routine

This routine is started when the switch SW2 for starting the midroll rewind is closed.

At a step 301, whether the switch SW2 is ON is judged. If the result of the judgment is "N", the step 301 is repeated, and if the result of the judgment is "Y", advance is made to a step 302.

At the step 302, the reverse rotation of the motor 26 is started to thereby begin the rewinding of the film.

At the next step 303, whether the location on the film to start the recording of the information L and T of the numbers of photographed frames has become opposed to the magnetic head 22, that is, whether the information recording part 1 of the film has been brought to the location immediately before it is opposed to the magnetic head 22, is judged. This judgment is effected by the detection of the amount of rewind film based on the output of the switch SW3 operated in operative association with a perforation. As long as the result of this judgment is "N", this judgment is repeated and the film rewinding is continued, and when the result of the judgment becomes "Y", the next step 304 is executed.

At the step 304, the head contact operation of bringing the magnetic head 22 into contact with the film is performed.

At the next step 305, the information L is read out from the memory in the CPU 21, and advance is made to a step 306.

At the step 306, the information T is read out from the memory in the CPU 21.

At the next step 307, the information L and T previously read out from the memory is written onto the information recording part 1 rewound while keeping contact with the magnetic head 22.

At the next step 308, whether the recording of the information L and T has been completed is judged. As long as the result of this judgment is "N", this judgment is repeated and magnetic recording by the magnetic head 22 is continued. When the result of the judgment becomes "Y", the next step 308' is executed.

At the step 308', the head detaching operation of detaching the magnetic head 22 from the film is performed, and advance is made to the next step 309.

At the step 309, whether the rewinding of the whole film has been completed is judged, and as long as the result of this judgment is "N", this judgment is repeated, and when the rewinding is completed and the result of the judgment becomes "Y", advance is made to the next step 310. The completion of the rewinding may be judged on the basis of the fact that the output of the film perforation detecting switch does not vary for a predetermined time, or may be judged by the output of a discrete switch provided for detecting the absence of the film in the film movement path.

At a step 310, the reverse rotation of the motor 26 is stopped to thereby complete the rewinding, and this routine is completed.

The operation succeeding to the step 302 of this rewinding routine is performed in subsequence to the aforedescribed steps 512,522 and 528 and steps 609 and 617 which will be described later.

Figure 4:
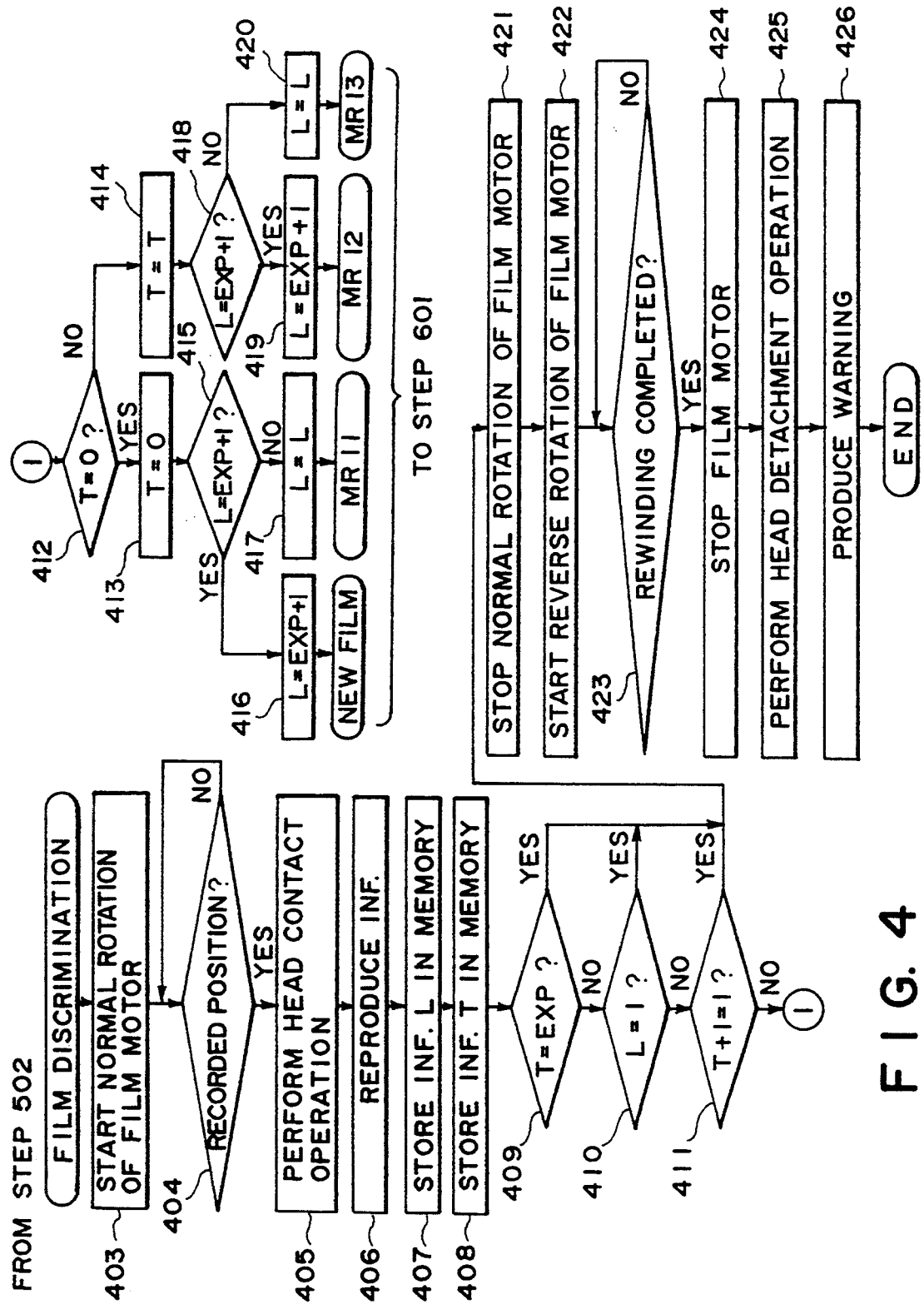

FIG. 4 is a flow chart showing the operation of discriminating between the states of use of the film which is performed after the formerly loaded information has been detected (since the step 502).

Process Succeeding to Step 403: the Routine for Discriminating between the States of Use of Film Having a Formerly Loaded History If at the step 502 of FIG. 5, it is judged that the film loaded into the camera has the formerly loaded history, the step 403 of FIG. 4 is first executed. At this step 403, the winding of the film is started by the start of the normal rotation of the film motor 26 and the film is drawn out of the cartridge.

At the next step 404, whether the information recording part 1 of the film has been brought to the location immediately before it is opposed to the magnetic head 22 is judged. This judgment can be effected, for example, by whether a switch provided in the film feeding path has detected the leading end of the leader portion of the film. The location at which this switch is installed is set to a location at which the information recording part 1 of the film is brought to the location immediately before it becomes just opposed to the magnetic head 22 when that switch detects the leading end of the leader portion. As long as the result of the judgment at the step 404 is "N", this judgment is repeated and the film winding is continued, and when the result of the judgment becomes "Y", advance is made to the next step 405.

At the step 405, the head contact operation of bringing the magnetic head 22 into contact with the film is performed, and advance is made to the next step 406.

At the step 406, the information L and T recorded on the information recording part 1 of the film is read out.

At the next step 407, this read-out information L is stored in the memory in the CPU 21, and a step 408 is executed.

At the step 408, this read-out information T is stored in the memory in the CPU 21.

At the next step 409, whether the value of the stored information T is equal to the total number of frames EXP (in the case of the film of FIG. 7, 36) is judged. If the result of this judgment is "Y", that is, if the last frame number photographed from the distal end of the film by the prewind mode is the 36th frame which is most adjacent to the leader portion, it means that there is no longer unphotographed frame and therefore, the process succeeding to a step 421 which will be described later is executed. If the result of the judgment at the step 409 is "N", shift is made to the next step 410.

At the step 410, whether the information L stored in the memory is equal to 1 is judged. If the result of this judgment is "Y", that is, if the last frame number photographed from the leader portion side of the film by the normal wind mode is the first frame which is most adjacent to the distal end, it means that there is no longer unphotographed frame and therefore, the process succeeding to a step 421 which will be described later is executed. If at the step 410, the result of the judgment is "N", advance is made to the next step 411.

At the step 411, whether the stored information T plus 1 is equal to the value of the information L is judged. If the result of this judgment is "Y", it means that photographing has been effected from both sides of the film with the result that unphotographed frames have become null and therefore, the process succeeding to the aforementioned step 421 is also executed. If at the step 411, the result of the judgment is "N", that is, if there remains an unphotographed frame or frames, advance is made to a step 412.

Process Succeeding to Step 412: the Case Where the Film Has a Formerly Loaded History and Has Unphotographed Frames At the step 412, whether the value of the information T is 0 (zero) is judged, and if the result of the judgment is "Y", that is, if photographing in the prewind mode has never been effected and therefore the first frame which is the frame most adjacent to the distal end is an unphotographed frame, the process succeeding to a step 413 is executed, and if the result of the judgment is "N", the process succeeding to a step 414 is executed.

Process Succeeding to Step 413 the Case of Film Which Has a Formerly Loaded History and Has Never Been Photographed in the Prewind Mode At the step 413, 0 is stored as the value of the information T in the memory (since 0 read out from the information recording part 1 has already been stored in the memory, this step 413 can be omitted).

At the next step 415, whether the value of the information L is equal to the total number of frames EXP plus 1 (in the case of the film of FIG. 7, 37), that is, whether the 36th frame which is the frame most adjacent to the leader portion is an unphotographed frame because photographing in the normal wind mode has never been performed, is judged. If the result of this judgment is "Y", advance is made to a step 416, and if the result of the judgment is "N", advance is made to a step 417.

Process Succeeding to Step 416: the Case of Film Which Has Never Been Photographed in Either Wind Mode If a advance is made to the step 416, the film is judged to be film which has a formerly loaded history, but has never been photographed from either end portion of the film as shown in FIG. 7(a). At this step 416, the total number of frames EXP plus 1, i.e., in the case of the film of FIG. 7, a numerical value 37, is stored as the value of the information L in the memory (since 37 read out from the information recording part 1 has already been stored in the memory, this step 416 can be omitted). Therefore, shift is made to a step 601 which will be described later, and the photographing operation, etc. are executed.

Process Succeeding to Step 417: the Case of Film Which Has a Formerly Loaded History and Has Never Been Photographed in the Prewind Mode, but Has Once Been Photographed in the Normal Wind Mode If advance is made to a step 417, the film is judged to be film which has a formerly loaded is judged to be film which has a formerly loaded history and has never been photographed in the prewind mode, but has once been photographed in the normal wind mode, i.e., film which has only been photographed from the leader portion side of the film. An example of such film is shown in FIG. 7(b), and is given a classification name MR11 for the sake of convenience. At this step 417, the information L read out from the information recording part 1 is intactly stored as the value of the information L in the memory. In the case of the film of FIG. 7(b), a numerical value 36 is stored as the information L in the memory. Thereafter, shift is made to a step 601 which will be described later.

Process Succeeding to Step 414: the Case of Film Which Has a Formerly Loaded History and Has Once Been Photographed in the Prewind Mode At the step 414, the information T read out from the information recording part 1 is intactly stored as the value of the information T in the memory. In the case of the film of FIG. 7(c) or 7(d), a numerical value 1 is stored as the information T in the memory.

At the next step 418, as at the aforedescribed step 415, whether the value of the information L is equal to the total number of frames EXP plus 1 (in the case of the film of FIG. 7, 37), that is, whether the 36th frame which is the frame most adjacent to the leader portion is an unphotographed frame because photographing by the normal wind mode has never been effected, is judged. If the result of the judgment is "Y", advance is made to a step 419, and if the result of the judgment is "N", advance is made to a step 420.

Process Succeeding to Step 419: the Case of Film Which Has a Formerly Loaded History and Has Once Been Photographed in the Prewind Mode, but Has Never Been Photographed in the Normal Wind Mode If advance is made to the step 419, the film is judged to be film which has a formerly loaded history and has once been photographed in the prewind mode, but has never been photographed in the normal wind mode, i.e., film which has once been photographed only from the distal end portion side of the film. An example of such film is shown in FIG. 7(c), and is given a classification name MR12 for the sake of convenience. At this step 419, as at the aforedescribed step 416, the total number of frames EXP plus 1 is stored as the value of the information L in the memory (since EXP+1 read out from the information recording part 1 has already been stored in the memory, this step 419 can be omitted). Thereafter, shift is made to a step 601 which will be described later, and the photographing operation, etc. are executed.

Process Succeeding to Step 420: the Case of Film Which Has a Formerly Loaded History and Has Once Been Photographed in Both Wind Modes If advance is made to a step 420, the film is judged to be film which has a formerly loaded history and has once been photographed from both end portions of the film. An example of such film is shown in FIG. 7(d), and is given a classification name MR13 for the sake of convenience. At this step 420, the information L read out from the information recording part 1 is intactly stored as the value of the information L in the memory. Thereafter, shift is made to a step 601 which will be described later.

Process Succeeding to Step 421: the Case of Film Which Has a Formerly Loaded History and Whose Frames Have All Been Photographed If the result of the judgment at the step 409 is "Y" (if all frames have been photographed in the prewind mode), if the result of the judgment at the step 410 is "Y" (if all frames have been photographed in the normal wind mode), and if the result of the judgment at the step 411 is "Y" (if all frames have been photographed in both wind modes), the process of a step 421 onward is executed.

First, at the step 421, the normal rotation of the film feeding motor 26 is stopped.

At the next step 422, the reverse rotation of the motor 26 is started to rewind the film into the film cartridge.

At the next step 423, as at the step 309, whether the rewinding of the whole film has been completed is judged, and as long as the result of the judgment in "N", this judgment is repeated, and if the rewinding is completed and the result of the judgment becomes "Y", advance is made to the next step 424.

At the step 424, the reverse rotation of the motor 26 is stopped to thereby terminate the rewinding.

Subsequently, at a step 425, the head detaching operation of detaching the magnetic head 22 from the film is performed, and advance is made to the next step 426.

At the next step 426, an aural or visual warning operation is performed to indicate that all frames have been photographed, thus terminating this routine.

Figure 6:
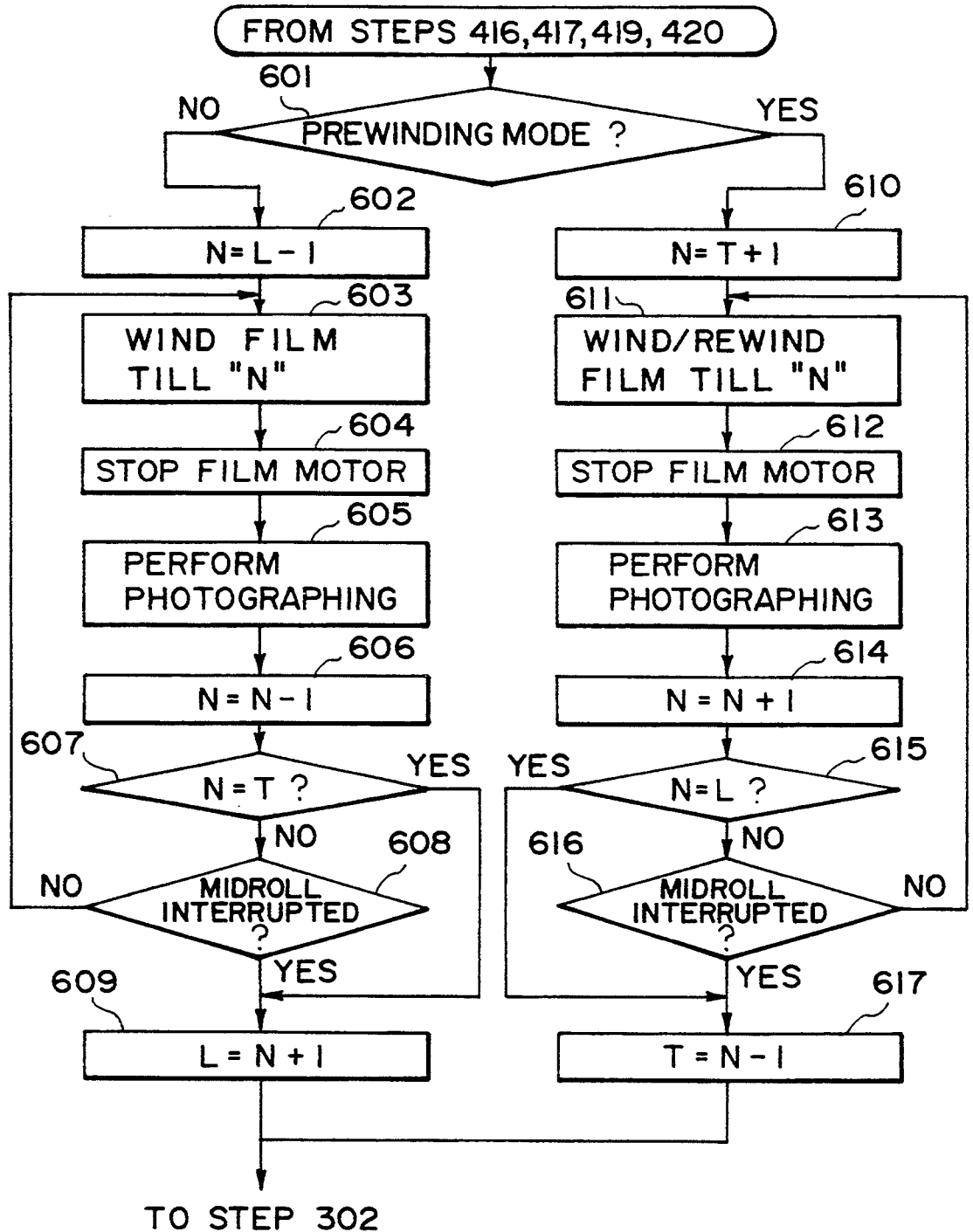

FIG. 6 is a flow chart showing the operation when the film is discriminated as film which has a formerly loaded history and has unphotographed frames (when the aforedescribed steps 416, 417, 419 and 420 are executed).

Process Succeeding to Step 601: the Case Where the Film Is Discriminated as Film Which Has a Formerly Loaded History and Has Unphotographed Frames First, at a step 601, the switch SW0 is monitored to judge whether the prewind mode is now selected. If at the step 601, the answer is "N", that is, if the normal wind mode is selected, advance is made to a step 602, and if the answer is "Y", that is, if the prewind mode is selected, advance is made to a step 610.

Process Succeeding to Step 602: the Case Where the Film Is Film Which Has a Formerly Loaded History and Has Unphotographed Frames and the Normal Wind Mode Is Selected At the step 602, numerical value data resulting from 1 being decremented from the information L of the number of photographed frames in the first film feeding direction (the normal winding direction) is set as a numerical data value N indicated by a frame number counter, not shown (for example, when the step 602 has come via the steps 416 and 419, L=EXP+1 and therefore N=EXP).

At a step 603, the film winding is started to position the frame of the number corresponding to this counter value data N at the aperture rearward of the photo-taking lens.

When the winding at the step 603 is completed, 10 the film feeding motor 26 is stopped at a step 604.

At a step 605, the photographing operation (the photographing operation for the frame of number N positioned at the aperture rearward of the photo-taking lens) is performed on condition that an operation has been applied to the release button, not shown.

When the photographing operation is completed, at the next step 606, 1 is decremented from the value N of the frame number counter.

Subsequently, at a step 607, whether the value N of the frame number counter is equal to the information T of the numbers of photographed frames in the second film feeding direction (the prewind direction), that is, whether all frames have been photographed, is judged. If the result of the judgment at the step 607 is "N", advance is made to a step 608, and if the result of the judgment is "Y", the program skips to a step 609.

At the step 608, whether there is an operation for commanding the midroll interrupt of the film is judged by whether the switch SW2 is ON. If the result of this judgment is "Y", advance is made to the step 609. If the result of the judgment is "N", return is made to the step 603, where the photographing by the next unphotographed frame is made possible. At the step 609, numerical value data resulting from 1 being incremented to the counter value N is set as the information L of the number of photographed frames. Thereafter, the film rewinding process succeeding to the aforedescribed step 302 is executed, and in this process, this value of L is written onto the information recording part 1 of the film.

Process Succeeding to Step 610: the Case Where the Film Is Film Which Has a Formerly Loaded History and Has Unphotographed Frames and the Prewind Mode Is Selected At a step 610, numerical value data resulting from 1 being incremented to the information T of the number of photographed frames in the second film feeding direction (the prewind direction) is set as the counter value N (for example, where the step 610 has come via the step 413, T=0 and therefore N=1).

At a step 611, the film winding is started to position the frame of the number corresponding to this counter value data N at the aperture rearward of the photo-taking lens.

When the winding at the step 611 is completed, the film feeding motor 26 is stopped at a step 612.

At a step 613, a photographing operation similar to the step 605 is performed.

When the photographing operation is completed, at the next step 614, 1 is incremented to the value N of the frame number counter.

Subsequently, at a step 615, whether the value N of the frame number counter is equal to the information L of the number of photographed frames in the first film feeding direction (the normal wind direction), that is, whether all frames have been photographed, is judged. If the result of the judgment at the step 615 is "N", advance is made to a step 616, and if the result of the judgment is "Y", the program skips to a step 617.

At the step 616, as at the step 608, whether there is an operation for commanding the midroll interrupt of the film is judged, and if the result of the judgment is "Y", advance is made to the step 617. If the result of the judgment is "N", return is made to the step 603, where the photographing by the next unphotographed frame is made possible, but in this case, the counter value N is incremented because the prewind mode is selected, and therefore the film feeding direction is reversed to the rewinding direction.

At the step 617, numerical value data resulting from 1 being decremented from the counter value N is set as the information T of the number of photographed frames. Thereafter, the film rewinding process succeeding to the aforedescribed step 302 is executed, and in this process, the value of this information T is written onto the information recording part 1 of the film.

Since the camera according to the above-described camera is a camera in which the normal wind mode and the prewind mode are changeable over therebetween, photographing in the both wind mode can be performed for a roll of film (the classification MR13 of FIG. 7(d)), and it is also simply possible to once rewind this film in the course of use and take it out, and thereafter load it and resume the use. Accordingly, for example, by taking the photograph of a figure in the prewind mode and taking the photograph of landscape in the normal wind mode, the photograph of a figure and the photograph of landscape can be continuously arranged on a piece of film, and by cutting the film at the boundary therebetween, the film can be divided into the film of the figure photograph and the film of the landscape photograph and be pigeonholed.

Also, where a roll of film loaded in a camera in which the two wind modes are changeable over therebetween is used by two users, one user can photograph in the normal wind mode and the other user can photograph in the prewind mode and therefore, the film photographed by the two users can be divided into two. Accordingly, the two users can take charge of those portions of the film which have been photographed by themselves discretely.

While in the above-described embodiment, the film feeding mode can be changed over between the normal wind mode and the prewind mode, the present invention is not restricted thereto, but can also be applied to a camera in which only one of the two wind modes is possible. The effect when as described above, a roll of film is used by two users is an effect which can also be realized when one of the user of a camera exclusively for the normal wind mode and the user of a camera exclusively for the prewind mode reloads a roll of film being photographed by one of the cameras into the other camera after the midroll rewinding to thereby perform photographing.

In the above-described embodiment, the specifying of the photographed frames on the film has been effected with absolute frame numbers allotted thereto, but alternatively, a relative number of photographed frames from the both side directions of the frame may be recorded (for example, it is to be understood that if the information L is 3, three frames as counted from the leader portion of the film are photographed frames, and if the information T is 4, four frames as counted from the distal end portion of the film are photographed frames).

Also, in the above-described embodiment, the information regarding photographed frames is recorded on and reproduced from a magnetic recording part provided in the leader portion of film, but alternatively, design may be made such that as disclosed, for example, in U.S. Pat. No. 4,878,075, each time the photographing by a certain frame is completed, information to the effect that frame is a photographed frame is recorded on an information recording part provided near each frame of film by a magnetic head and this information is read out by the magnetic head when this film is reloaded into the camera. Also, design may be made such that as disclosed in Japanese Laid-Open Patent Application No. 1-233431 (corresponding to U.S. application Ser. No. 465,310, German Application No. P3908490.6 and French Application No. 8903407), information regarding photographed frames is magnetically recorded on and reproduced from an information recording part provided on a cartridge.

Also, in the above-described embodiment, formerly loaded information is applied in an externally discriminable form onto the cartridge but alternatively, it may be recorded in an externally indiscernible form.

Also, in the above-described embodiment, formerly loaded information indicative of whether the film has once been loaded into a camera is used as discriminative information for judging whether the reading-out (reproduction) of information regarding photographed frames is necessary, but alternatively, as disclosed in Japanese Patent Application No. 2-30508 (filed on Feb. 9, 1990, and also filed as a U.S. application and a European application), the position of a display member displaying the state of use of film may be used as discriminative information. This display member is designed to be able to display externally discriminably whether the state of use of the film in a cartridge is a totally unused state, a totally used state or a partly used state, and is provided for rotation with a reel (i.e., a magazine shaft) around which the film twines in the cartridge. A camera fit for the cartridge provided with such display member effects the control of the stopped position of the display member during electric rewinding by the control of the stop time of an electric rewinding motor conforming to the state of use of the film recognized by the camera itself and therefore, the state of use of the film in the cartridge can be discriminated from the display member of the cartridge taken out of the camera. It is only when this display member is in a position indicative of a partly used state that the operation of reading out the information regarding photographed frames is necessary and therefore, means for detecting that the display member is in this position indicative of a partly used state may be provided in the camera so that the operation of reading out the information regarding photographed frames may be performed only when that detection has been effected.

The discriminative information indicative of whether the operation of reading out the information regarding photographed frames need not always be disposed on the cartridge, but may be disposed, for example, on the externally exposed portion of the reel (i.e., the magazine shaft) around which the film twines in the cartridge.

The recording form of the information regarding photographed frames and the discriminative information indicative of whether the reading-out of said information is necessary is not limited to the magnetic form or the externally-discriminable form as in the above-described embodiment, but such information may be recorded, for example, in a semiconductor memory provided on the cartridge.

We claim:

1. A camera adapted to be loaded with a film unit having film including a plurality of frames, a cartridge containing said film therein and information-recorded means, said camera including:
   first recording means for recording on said information-recorded means information relating to photographed frames indicative of which of the frames of said film is a photographed frame;
   first reproducing means for reproducing from said information-recorded means said information relating to photographed frames recorded by said first recording means;
   second recording means for recording on said information-recorded means discriminative information indicative of whether the reading-out of said information relating to photographed frames by said first reproducing means is necessary;
   second reproducing means for reading out said discriminative information recorded by said second recording means from said information-recorded means; and
   control means for operating said second reproducing means when said film unit is loaded into said camera, and operating said first reproducing means when said discriminative information read out by said second reproducing means indicates that the reproducing of said information relating to photographed frames is necessary, and inhibiting the operation of said first reproducing means when said discriminative information indicates that said reproducing is unnecessary.

2. A camera according to claim 1, wherein said information-recorded means includes a first information-recorded portion and a second information-recorded portion provided on discrete locations on said film unit, said information relating to photographed frames is recorded on said first information-recorded portion, and said discriminative information is recorded on said second information-recorded portion.

3. A camera according to claim 2, wherein said first information-recorded portion is provided on said film, and said second information-recorded portion is provided on said cartridge.

4. A camera according to claim 3, wherein said information relating to photographed frames is recorded in a magnetically reproducible form on said first information-recorded portion, said discriminative information is recorded in an externally discriminable form on said second information-recorded portion, said first information recording means and said first information reproducing means include a magnetic head, said second information recording means includes means for imparting a change to the external appearance of said second information-recorded portion, and said second information reproducing means includes means for detecting the state of the external appearance of said second information-recorded portion.

5. A camera according to claim 1, further including film feeding means controlled by said control means and wherein said control means controls said film feeding means on the basis of said information relating to photographed frames reproduced by said first information reproducing means to thereby move a photographed frame of said film from a photographable position and position an unphotographed frame of said film at said photographable position.

6. A camera according to claim 2, wherein said information relating to photographed frames is recorded on said first information-recorded portion in a magnetically reproducible form;
   said first reproducing means includes a magnetic head means for reproducing said information relating to photographed frames from said first information-recorded portion;
   said control means causes said magnetic head means to be in contact with said first information-recorded portion when said discriminative information read out by said second reproducing means indicates that the reproducing of said information relating to photographed frames is necessary, and does not cause said magnetic head means to be in contact with said first information-recorded portion when said discriminative information indicates that said reproducing is unnecessary.

7. A camera according to claim 6, wherein said first recording means records said information relating to photographed frames on said first information-recorded portion by the use of said magnetic head means.

8. A camera according to claim 1, wherein when said control means operates said first reproducing means to reproduce said information relating to photographed frames, said control means detects the state of use of said film unit on the basis of the reproduced information relating to photographed frames.

9. A camera according to claim 8, further including notification means which performs a notification according to said information relating to photographed frames reproduced by said first reproducing means.

10. A camera according to claim 9, wherein said notification means performs a notification for warning when said information relating to photographed frames indicates that all frames of said film have been exposed.

11. A camera adapted to be loaded with a film unit having film including a plurality of frames, a cartridge containing said film therein and information-recorded means, said camera including:
   first recording means for recording on said information-recorded means information relating to photographed frames indicative of which of the frames of said film is a photographed frame;
   first reproducing means for reproducing from said information-recorded means said information relating to photographed frames recorded by said first recording means;
   second recording means for recording on said information-recorded means discriminative information indicative of whether the reading-out of said information relating to photographed frames by said first reproducing means is necessary;
   second reproducing means for reading out said discriminative information recorded by said second recording means from said information-recorded means;
   film feeding means for feeding said film; and
   control means for causing said first recording means to record on said information-recorded means information on the basis of a feeding direction by said film feeding means.

12. A recording method of a camera capable of loading therein a film unit which has a film including a plurality of frames, a cartridge and an information-recording portion, comprising:
   recording on said information-recording portion first information relating to photographed frames indicative of which of the frames of said film is a photographed frame;
   recording on said information-recording portion second information indicative of whether the reading-out of said first information is necessary;
   reading out said second information from said information-recording portion when said film unit is loaded into said camera; and
   reproducing from said information-recording portion said first information when the read out second information indicates that reading-out of said first information is necessary and not reproducing from said information-recording portion said first information when said read out second information indicates that reading-out of said first information is unnecessary.

13. A recording method of a camera capable of loading therein a film unit which has a film including a plurality of frames, a cartridge and an information-recording portion, comprising:
   feeding said film;
   recording, on the basis of a film feeding direction, on said information-recording portion first information relating to photographed frames indicative of which of the frames of said film is a photographed frame;
   reproducing from said information-recording portion said first information;
   recording on said information-recording portion second information indicative of whether the reading-out of said first information is necessary; and
   reading out said second information from said information-recording portion when said film unit is loaded into said camera.

14. A device adapted to be loaded with a film unit having film including a plurality of frames, a cartridge containing said film therein and information-recorded means, said device including:
   first recording means for recording, on said information-recorded means information relating to photographed frames indicative of which of the frames of said film is a photographed frame;
   first reproducing means for reproducing from said information-recorded means said information relating to photographed frames recorded by said first recording means;
   second recording means for recording on said information-recorded means discriminative information indicative of whether the reading-out of said information relating to photographed frames by said first reproducing means is necessary;
   second reproducing means for reading out said discriminative information recorded by said second recording means from said information-recorded means; and
   control means for operating said second reproducing means when said film unit is loaded into said device, and operating said first reproducing means when said discriminative information read out by said second reproducing means indicates that the reproducing of said information relating to photographed frames is necessary, and saving the operation of said first reproducing means when said discriminative information indicates that said reproducing is unnecessary.

15. A device adapted to be loaded with a film unit having film including a plurality of frames, a cartridge containing said film therein and information-recorded means, said device including:
   first recording means for recording on said information-recorded means information relating to photographed frames indicative of which of the frames of said film is a photographed frame;
   first reproducing means for reproducing from said information-recorded means said information relating to photographed frames recorded by said first recording means;
   second recording means for recording on said information-recorded means discriminative information indicative of whether the reading-out of said information relating to photographed frames by said first reproducing means is necessary;
   second reproducing means for reading out said discriminative information recorded by said second recording means from said information-recorded means;
   film feeding means for feeding said film; and
   control means for causing said first recording means to record on said information-recorded means information on the basis of a feeding direction by said film feeding means.

16. A recording method of a device capable of loading therein a film unit which has a film including a plurality of frames, a cartridge and an information-recording portion, comprising:

recording on said information-recording portion first information relating to photographed frames indicative of which of the frames of said film is a photographed frame;

recording on said information-recording portion second information indicative of whether the reading-out of said first information is necessary;

reading out said second information from said information-recording portion when said film unit is loaded into said device; and reproducing from said information-recording portion said first information when the read out second information indicates that reading-out of said first information is necessary and not reproducing from said information-recording portion said first information when said read out second information indicates that reading-out of said first information is unnecessary.

17. A recording method of a device capable of loading therein a film unit which has a film including a plurality of frames, a cartridge and an information-recording portion, comprising:

feeding said film:

recording, on the basis of a film feeding direction, on said information-recording portion first information relating to photographed frames indicative of which of the frames of said film is a photographed frame;

reproducing from said information-recording portion said first information;

recording on said information-recording portion second information indicative of whether the reading-out of said first information is necessary; and reading out said second information from said information-recording portion when said film unit is loaded into said device.

* * * * *